(12) United States Patent
Belliveau et al.

(10) Patent No.: US 6,172,822 B1
(45) Date of Patent: Jan. 9, 2001

(54) LENS HOLDER

(75) Inventors: Richard S. Belliveau, Austin; Thomas S. Cavness, Georgetown; Mikhail Dubinovskiy, Austin; Michael K. Rafalko, Leander; Mark A. Stultz; Terry L. Wilmoth, both of Austin, all of TX (US)

(73) Assignee: High End Systems, Inc., Austin, TX (US)

( * ) Notice: Under 35 U.S.C. 154(b), the term of this patent shall be extended for 0 days.

(21) Appl. No.: 09/035,572

(22) Filed: Feb. 25, 1998

(51) Int. Cl.$^7$ .................................................... G02B 7/02
(52) U.S. Cl. .............................................................. 359/819
(58) Field of Search .................................... 359/819, 811, 359/808, 818, 822; 353/100; 362/455

(56) References Cited

U.S. PATENT DOCUMENTS

| | | | |
|---|---|---|---|
| 4,187,534 | 2/1980 | Tichenor et al. | 362/268 |
| 4,585,308 | 4/1986 | Negoro | 362/252 |
| 4,709,311 | 11/1987 | Bornhorst | 362/277 |
| 5,737,131 | * 4/1998 | Palmer | 359/819 |

OTHER PUBLICATIONS

Colortran, Colortran Lighting Product Guide, p. 2.

* cited by examiner

Primary Examiner—Ricky Mack

(57) ABSTRACT

A lens holder includes which a bottom cover, a top cover, sliding means and clipping means for holding lens assemblies in an optical lighting system. The bottom and top covers have a plurality of slot extensions lining the interior of the two covers. The top cover clips to the bottom cover by a set of clips on each side of the top cover to a set of clip slots on each side of the bottom cover. Lens assemblies can consist of lenses assembled in a holder along with individual lenses which can slide into between slot extensions.

14 Claims, 3 Drawing Sheets

LENS HOLDER

FIELD OF THE INVENTION

The present invention relates to assemblies of optical components, particularly lenses, which are to be precisely contained in an apparatus with respect to each other in order to modify a beam of light. In addition, it relates to the modularity and interchangeability of the apparatus which will hold such assemblies. The invention is particularly useful in holding lens assemblies in optical projection systems in the entertainment lighting industry, and is therefore described below with greater respect to this application.

BACKGROUND OF THE INVENTION

Linearly-arranged lens assemblies have been used in many applications to modify a beam of light. The curvature of the lens, the size of the lens, the number of lenses, distance separating lenses, and the distance between the beam of light and the lenses are all variables in modification. Lens assemblies are typically secured permanently in a lens holder composed of metal or plastic for placement in a system. Lenses are typically mechanically secured for by example a screw, sealant or elastic at a position in the lens holder.

The conventional way of accomplishing beam modification in an optical system is to affix a lens holder at a specific location within a lighting fixture. A single lens holder containing a lens or an assembly of lenses attaches within the fixture with screws or the like along the path of the optical axis.

In the entertainment lighting industry, the specification of a particular lighting fixture, in many cases, may include the beam angle. The beam angle describes the rate at which the beam emanates from the fixture as it travels from the fixture toward a target. In many prior art fixtures, the beam angle can be varied automatically by mechanical systems that move the position of one or more of the lenses in the optical path relative to the other lenses in the optical path. In many cases, these mechanisms can be operated automatically and/or remotely by control systems that are well known. However, the costs of these mechanical systems can be prohibitive for many applications. As a result in many prior art fixtures, changing the beam angle available requires tools to remove the current lens holder and install a new holder. In addition, the fixture modularity is often limited by the single position available for installing the lens holder within the fixture.

The ability to change lens systems easily and in a timely manner within a fixture would provide beam modification interchangeability to the fixture by giving the user a plurality of interchangeable lens assembly configurations for use in a single fixture. Multiple positions available for placement of lenses and lens assemblies in a fixture would provide beam modification modularity by giving the user a fixed plurality of positions for lens placement.

DETAILED DESCRIPTION

Figure 1:
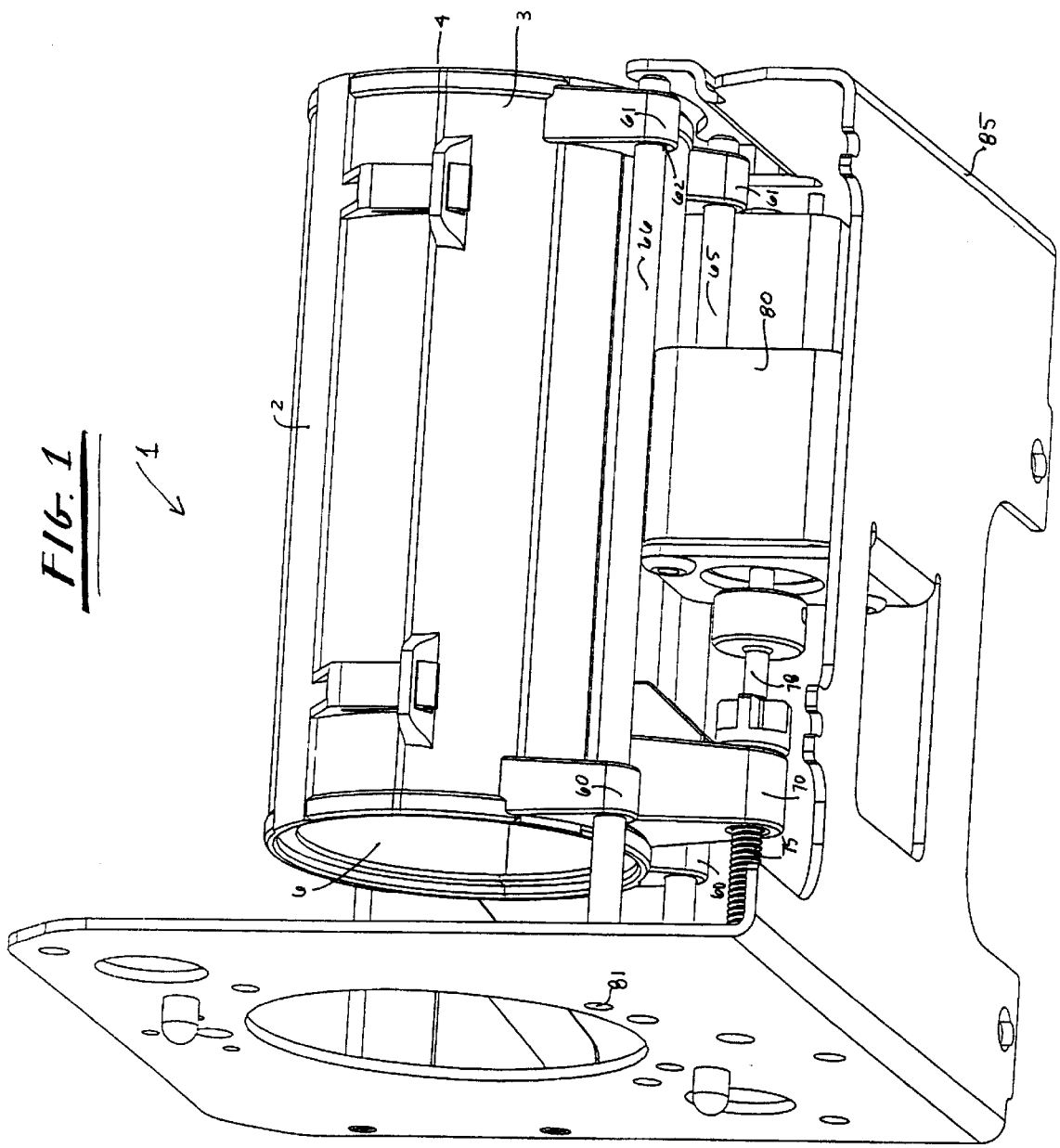
FIG. 1 is a top-side perspective view showing the modular and interchangeable lens holder accompanied by the sliding system.

One embodiment of the present invention is shown in FIG. 1 which is an illustration of a lens holder 1 which can be installed in a lighting fixture (not shown) so that its center axis 10 is intended to be colinear with the optical axis of the light fixture. The lens holder 1 shown in FIG. 1 has two ports 4 and 6. One port is a light beam entry port 4 and the other is a light beam exit port 6.

In FIG. 1, a bottom cover 3 has two sets of rod hole extensions 60 and 61 positioned about the bottom of the bottom cover 3 at each end of the cylinder. Each rod hole extension extends down from the exterior of the bottom cover 3 and has a rod hole 62 for receiving sliding rods 65 and 66. Each sliding rod 65 and 66 slides through two rod holes 62 at opposite ends of bottom cover 3. In the embodiment shown, the rod hole extensions are at the ends of the bottom cover 3 and the two (2) sliding rods 65 and 66 extend past the length of the bottom cover 3. In other embodiments of the invention, it might be preferable to have the rod extension positions, number of sliding rods and length of sliding rods vary to fit within a desired fixture configuration.

In the embodiment shown, each end of each sliding rod 65 and 66 aligns with one of two (2) holes at each end of the metal driver holder 85. The sliding rods 65 and 66, positioned in the tubular rod holes 62, are affixed to the metal driver holder 85 with rod screws 81 driven through the holes in the metal driver holder and through the ends of each sliding rod. The metal driver holder 85 is placed within the system so that the center axis 10 of the lens holder 1 is intended to be colinear with the optical axis of the light fixture (not shown) and the sliding rods 65 and 66 are parallel to the optical axis of the light fixture. By using a metal driver holder, the lens holder 1 and sliding system are assembled on a common base before placement in the fixture. However, in other embodiments of the invention the lens holder 1 and sliding system might be directly affixed in a fixture; or the lens holder 1 might be affixed in a fixture without a sliding system.

In FIG. 1, a motor 80, mounted on the base of the metal driver holder 85, drives a motor drive rod 78 which supports a driver screw 75. The driver screw 75 rotates through a driver screw holder 72. The driver screw holder 72 is positioned within a tubular drive hole 71 bore in a driver extension 70. The driver extension 70 extends down from the base of the bottom cover 3 at the rightmost end of the cylinder as viewed in FIG. 2. In the embodiment shown, the driver extension 70 extends farther from the bottom cover 3 than the rod hole extensions 60 and 61 so that the motor positioning does not interfere with the bottom cover 3 or the sliding rods 65 and 66. It should be appreciated that in other configurations of the invention utilizing a sliding system, the driver screw extension might be positioned otherwise to accommodate alternate positioning of the motor.

Motor 80 can be controlled through any known means, for example: software functions or a programmed microcontroller. For clockwise or counterclockwise rotation of the motor 80, the motor drive rod 78 is rotated which rotates the affixed driver screw 75. As the driver screw 75 rotates clockwise or counterclockwise in the driver screw holder 72, the position of the driver screw holder 72 along the driver screw 75 changes. The bottom cover is driven linearly by the angular rotation of the driver screw 75 within the driver screw holder 72. The bottom cover 3 slides along the sliding rods 65 and 66 as the driver screw 75 is rotated by the motor. When the motor is active, the bottom cover slides along the rods as allowed. When the motor is stopped, the bottom holder is held in position. In the embodiment shown, the movement of the lens holder 1 is linear along the center axis 10. However, in other embodiments, it might be advantageous to assemble the sliding system for non-linear and/or horizontal and vertical movement and use a plurality of motors or other drive systems.

Figure 2:
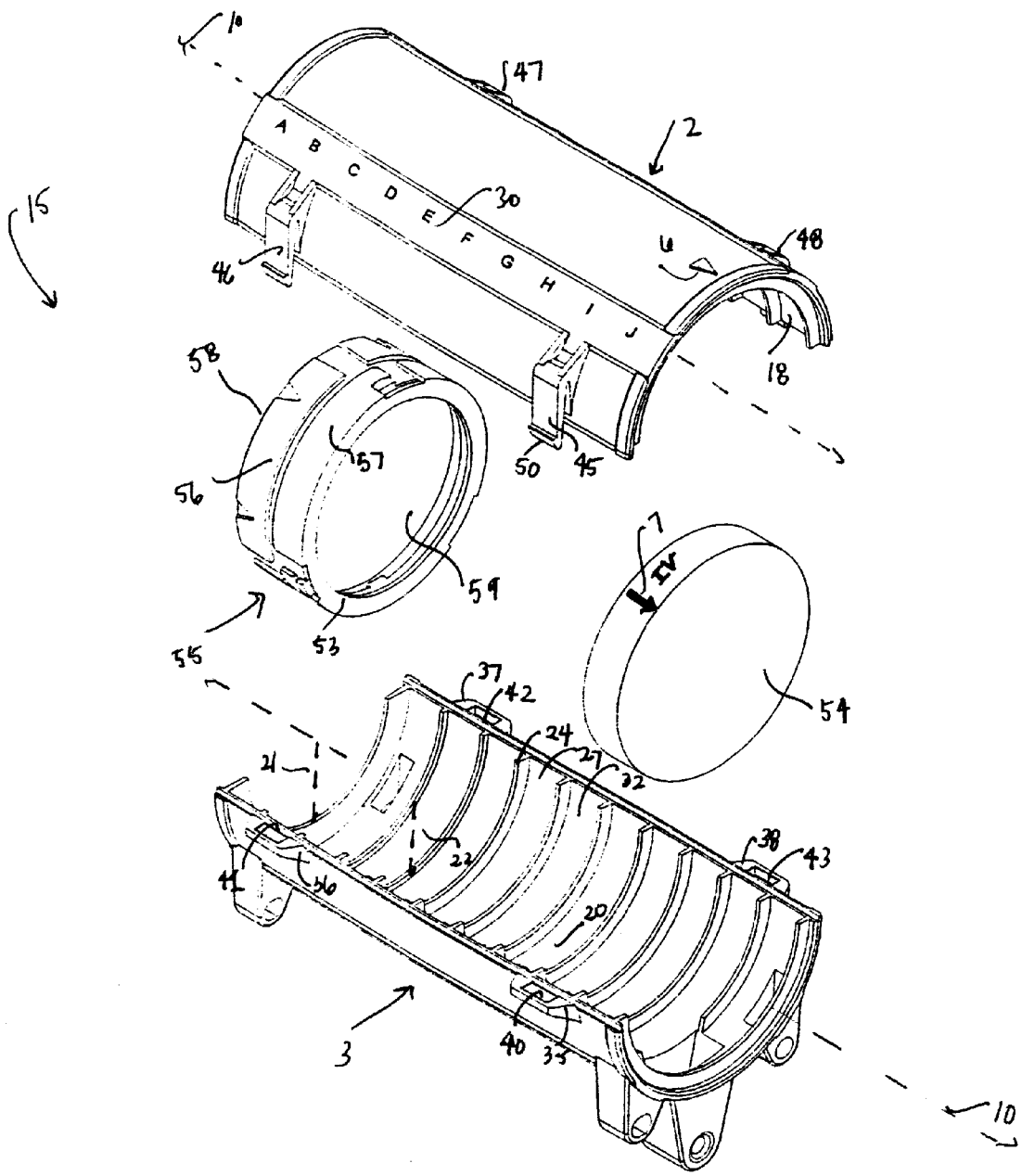
FIG. 2 is an exploded view showing the top cover and bottom when the two parts are unclipped and lenses which can be placed in the lens holder.
Figure 3:
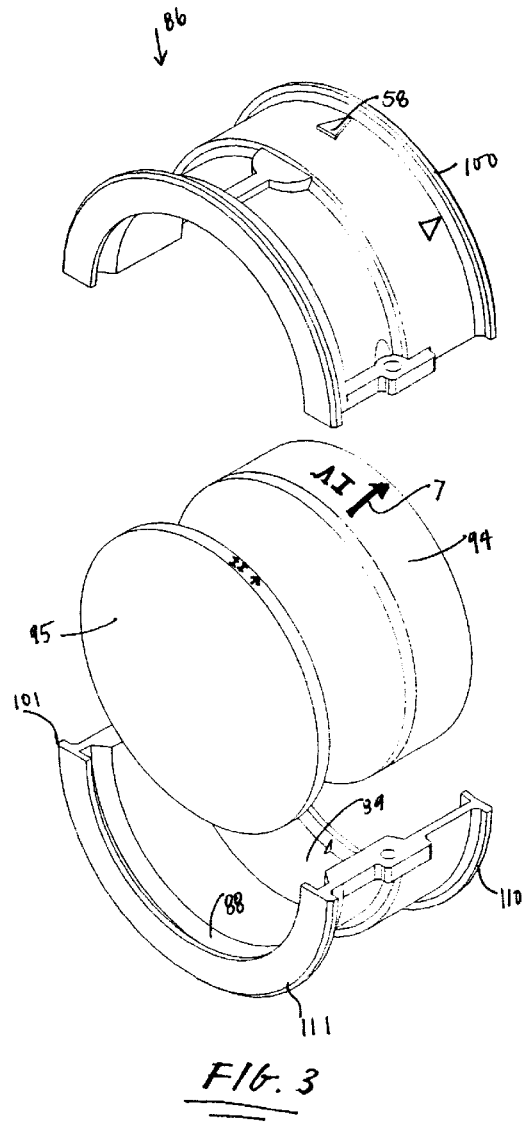
FIG. 3 is an exploded view of a lens subassembly and the lenses within.

FIG. 2 is an exploded view of the lens holder 1 of FIG. 1. In this embodiment of the invention the lens holder 1 has a main body 15 which is composed of two (2) parts: a top cover 2 and the bottom cover 3. In the design shown, all of the components which are used to mount the lens holder 1 are attached to or part of the bottom cover 3. Since the bottom cover 3 is the part of the lens holder 1, controlled by the sliding system, the top cover 2 can be affixed to and unaffixed from the bottom cover 3 without affecting the sliding system. This design by which the bottom cover 3 is controlled by the sliding system while still maintaining interchangeability and modularity meets the objectives of an improved invention.

In the embodiment shown, the interior surface 20 of the bottom cover 3 is defined by a portion of a cylinder, whose center axis is designed to be colinear with the light beam of the center axis 10 of the lighting fixture in which the lens holder 1 is intended to be used. It should be appreciated that other shapes of lens holders are possible. In some cases it may even be desirable to have covers that are some shape other than tubular.

A plurality of slots 32 are defined by a plurality of slot extensions: for example slot extension 24. Each slot extension 24 extends from the interior surface 20 of the bottom cover 3. The width of the slots is defined by the distance between two slot extensions 24. In the embodiment shown, the slots 32 are shown to have equal widths. In other embodiments of the invention, it might be preferable to have varying slot widths. A particular design of what slot width configurations would be most advantageous depends on the lens sets that are likely to be used in a particular fixture as will be discussed in greater detail below.

The height of slot extension 24 defines a slot extension radius 22 about the center axis 10. Since lenses will be inserted in these slots 32, typically it is desirable that the slot extension radius 22 be greater than an aperture radius 21. However for some lens configurations this may not be necessary. The aperture radius 21 regulates the aperture of the beam of light entering the lens holder and may be larger or smaller than the radius of the beam.

The top cover 2 also has an interior surface 18 which is complement to the interior surface 20 of the bottom cover 3. In the embodiment shown, the interior surface 18 of the top cover 2 is also defined by a portion of a cylinder with a central axis designed to be colinear with the center axis 10 of the lighting fixture when the top cover 2 is in an operational configuration: i.e. closed. Although it is not shown in FIG. 2, the interior surface 18 of the top cover 2 has slots and slot extensions which match/line up with the same elements in the bottom cover 3. However in the other embodiments of the invention slots and slot extensions may be absent form either the top or bottom covers or may not match or line up.

Therefore, when the top cover 2 clips onto the bottom cover 3, the interior surface radius 20, the aperture radius 21 and the slot extension radius 22 are defined for the interior surface and extensions of the lens holder 1 for both the interior of the top cover 2 and the interior of the bottom cover 3. Lenses which are placed in the bottom cover 3 between two of the plurality of slot extensions like slot space 27 will be aligned between the mirrored slot extensions of the top cover 2 when the top cover 2 is clipped to the bottom cover 3.

To designate the slot space 27 between slot extensions for placement of lenses, each slot space 27 is lettered along the base of the interior of the bottom cover 3. For example, slot space 27 is the fourth slot space and would be designated as D. The top cover 2 designates the same letter for each mirrored slot space of the bottom cover 3 and the plurality of letters 30 corresponding to each slot space are located on the exterior of the top cover 3. In other embodiments numbers might be used instead of letters to designate spaces. In addition, the placement of the designations might differ based on the visibility of the designators when the lens holder is placed in a fixture.

FIG. 2 shows a single lens 54 and a lens subassembly 55 exploded from the covers. The single lens 54 is an example of a single lens which fits into any of the slot spaces 32 available and is typically used in combination with a lens subassembly. Lens subassembly 55 is a sub lens holder which straddles a slot extension to utilize two neighboring slot spaces 32, but might be made to utilize any plurality of slot spaces in another embodiment. The lens subassembly 55 might contain a plurality of lenses with spacers separating the lenses and holding them at exact positions from each other. By utilizing a lens subassembly 55 with the lens holder, sets of lens are combined to obtain the desired effect, rather than using many loose single lenses 54.

Lens subassembly 55 has a holder ring 56 which has two ports. One port is entry port 58 and the other is exit port 59. A primary lens slides into the holder ring 56 through the exit port 59 and sits against the lip (not shown) extending from the holder ring 56 at the entry port 58. Spacers sit between the primary lenses and other lenses placed within the holder ring 56, not obstructing the passage of light through the lenses in the holder ring 56. Twist ring 57 twists and locks onto the exterior of holder ring 56 at the exit port 59. Twist ring 57 has a lip which secures the lenses and spacers within the holder ring 56. This embodiment of a lens assembly is flexible in that multiple assemblies of lenses might be configured to be secured within the holder ring 56, held apart at specific distances by spacers.

Figure 4:
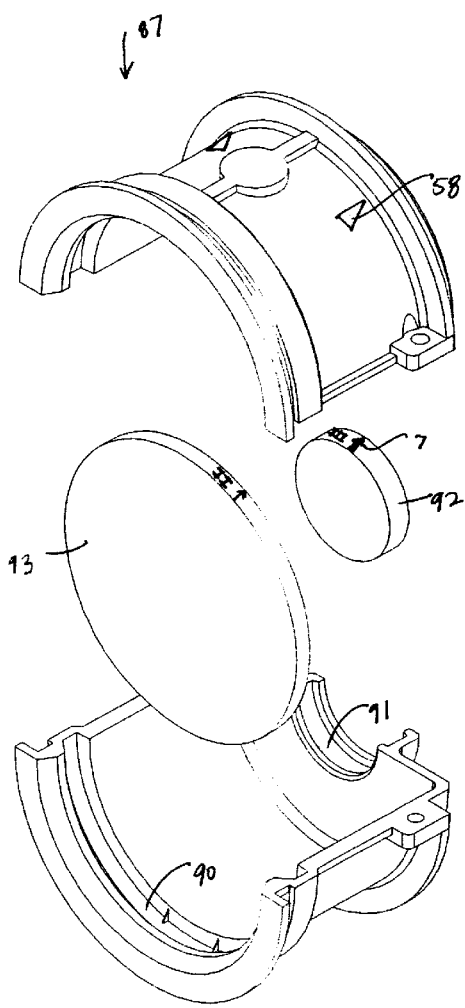
FIG. 4 is an exploded view of a lens subassembly and the lenses within.

FIGS. 4 and 5 illustrate two (2) independent lens subassemblies 86 and 87 which can be placed together within the lens holder to form a wider angle lens set. Each lens assembly is formed by two halves 100 and 102. Each half mirrors the other with interior specific slots 88, 89, 90, and 91 and exterior extensions 110 and 111. Specific slots can be sized to hold lenses of specific width and diameter. For example, the diameter of lens 92 is smaller than the diameter of lens 93 and lens 94 is wider than lens 95. The ability to use lenses of varied widths and diameters is important in configuring unique sets of lens subassemblies.

Exterior extensions 110 and 111 are greater in length than the slot extension with the lens holder 1. In the illustrated embodiment, the lens assemblies 86 and 87 expand across two slots. The exterior extensions 110 and 111 sit against the two neighboring slot extensions in the lens holder 1 and the core of each assembly sits above the middle slot extension The lens subassembly embodiments shown utilize holders which hold lenses in position without any adhesives and are composed of two parts which are not permanently affixed together. The lenses in these subassemblies could be easily replaced within each assembly holder shown. However, other lens subassemblies might be designed to be positioned within the lens holder 1 which include lenses sealed in place. Assembly holders might be a single piece or multiple pieces which can be permanently affixed together.

While lens assemblies are designed to fit in the lens holder 1, the diameter of the lens holder 1 would be determined by the size of lenses that would typically be used in the holder. For a small projector utilizing the modularity and interchangeability of lens holder 1, lenses with a relatively small diameter might be specified. For larger optical systems, the size of the lenses typically used in the system might be relatively large. The lens holder diameter should reflect the expected diameter of typical lenses to be used in the system. In addition, the slots widths of the lens holder 1 should reflect the typical widths of lenses to be used in the system.

In FIG. 2, the bottom cover 3 has clip hole extensions 35, 36, 37 and 38 extending out from the exterior of the lip of the bottom cover 3. Within each clip hole extension 35, 36, 37 and 38 are corresponding rectangular shaped clip holes 40, 41, 42 and 43. The top cover 2 has a set of clips 45, 46, 47 and 48 which extend out and down from the sides of the exterior of the top cover 2. Each clip 45, 46, 47 and 48 ends in a triangle stopper like the triangle stopper 50 on clip 45. The triangle stopper 50 is almost as wide and long as clip hole 40 in clip hole extension 35.

To clip the top cover 2 onto the bottom cover 3, the triangle stopper 50 at the end of each clip on top cover 2 is aligned at the mirrored clip holes of the bottom cover 3. Each triangle stopper 50 is pushed through the clip hole by pressing the clip towards the top cover 2. Once pushed through, each triangle stopper 50 is retained under the outer bottom edge of each clip hole extension. To unclip the top cover 2 from the bottom cover 3, each clip is pressed towards the top cover 2 and then the top cover can be pulled away from the bottom cover as each triangle stopper slips out of each clip hole. Because the main object of the present clipping means is an easy, reliable means of holding the covers together, it should be appreciated that other forms of known clipping mechanisms or fasteners might be used in other embodiments.

To aid the user in the placement of the top cover 2 onto bottom cover 3, the placement of lens subassemblies in the lens holder 1 and single lenses 54, arrows are positioned on these typically symmetrical parts to add a distinct directional characteristic. When placed, all the arrows on marked parts should be pointing in the same reference direction. In this embodiment, the reference direction for all the arrows on all parts is in the direction of the light beam exit port 6. In other embodiments it might be preferable to change the reference direction for placement of parts.

As illustrated in FIG. 2, the top cover 2 comprises a directional arrow 6 in the form of a narrow triangle pointing toward the exit port 6. The directional arrow 6 aids the user in correctly placing the top cover 2 onto the bottom cover 3. In this embodiment, only one directional arrow 6 is placed on the top cover. In other embodiments, the addition of arrows to the exterior of top cover 2 might be preferable.

In all the embodiments of lens subassemblies shown, each lens subassembly includes a plurality of arrows in the form of a triangle about the exterior of the subassembly holder. Lens subassembly 55 has a plurality of arrows 51 about the holder ring 56. Lens assembly 86 and 87 have a plurality of arrows 58 about the exterior of both halves 100 and 102. The plurality of arrows on these lens subassemblies aid the user in placing the lens subassemblies in the lens holder 1 so that they are facing the correct direction.

Single lenses 54 include an arrow 7 printed on the exterior edge of each lens. Also printed with the arrow might be an identifier of the type of lens, date made or size. For example, lens 54 is a type IV lens, while lens 95 is a type II lens. For lenses that are to be placed in a lens subassembly like lens 95, the use of arrows aids in the initial placement of the lenses in the lens subassembly and in the replacement of any lens in the subassembly if need be.

Based on the model previously described, interchangeability of the lens holder 1 stems from the use of two parts to form the lens holder 1. The two parts, the top cover 2 and the bottom cover 3, can be fastened together securely and separated easily. The modularity of the lens holder 1 stems from the plurality of slot spaces available in which lenses and lens assemblies can be placed. The lens holder 1 allows interchanging lenses and lens assemblies quickly and easily into a plurality of positions. More specifically, the use of quick release clips as fasteners provides a quick and easy way to attach and remove the top cover 2. Also, the top cover 2 with slot extensions mirroring the bottom cover provides horizontal and vertical stability to the lenses within the lens holder. This stability is needed in the embodiment in order to maintain the lens position within the lens holder about the center axis 10.

While embodiments of the present invention have been illustrated in the accompanied drawings and detailed in the Detailed Description, it will be understood that the invention is not limited to the embodiments disclosed, but is capable of numerous rearrangements, modifications and substitutions of parts without departing from the spirit of the present invention.

We claim:

1. A lens holder comprising:
   a bottom cover;
   a top cover;
   a clip for attaching the top cover to the bottom cover;
   a plurality of slot extensions lining the inside surface of the bottom cover wherein a plurality of slot spaces are defined by the surface space between each of the plurality of slot extensions;
   and at least one lens set with at least one lens is positioned within at least one slot space, said lens set with an marked on the edge to designate a reference direction.

2. A lens holder comprising:
   a bottom cover;
   a top cover;
   a clip for attaching the top cover to the bottom cover;
   a plurality of slot extensions lining the inside surface of the bottom wherein a plurality of slot spaces are defined by the surface space between each of the plurality of slot extensions; and
   a lens assembly holder holding at least one lens positioned in at least one slot space.

3. The lens holder of claim 2 wherein the lens assembly holder comprises a holder ring with an entry port and an exit port, a plurality of lenses within placed within the holder ring through the exit port, a plurality of spacers between each of the plurality of lenses, a twist ring which twists onto the exit port of the holder ring, and a plurality of arrows about the exterior.

4. The lens holder of claim 2 wherein the lens assembly holder comprises two halves of a tube with a plurality of interior specific slots for holding lenses of specific width and a plurality of exterior extensions for positioning the lens assembly holder between slot extensions.

5. A lens holder system comprising:

a bottom cover;

a top cover;

a clipping means for clipping the top cover to the bottom cover;

the bottom cover with a plurality of slot extensions lining the interior surface;

a sliding system for guiding the bottom cover for limited movement.

6. The lens holder system of claim 5 further comprising:

the bottom cover with at least two sets of rod hole extensions extending out from the bottom of the bottom cover, a tubular rod hole bore within each rod hole extension;

the bottom cover with a driver extension extending out from the bottom of the bottom cover, a driver screw holder positioned within a tubular drive hole bore in the driver extension; and a top cover with a plurality of slot extensions lining the interior surface mirroring the plurality of slot extensions lining the interior surface of the bottom cover.

7. The lens holder system of claim 6 wherein the sliding system comprises:

a motor;

a drive screw rotated angularly by the motor;

the drive screw rotating within the driver screw holder; and at least one sliding rod which slides through the rod holes in at least one set of rod hole extensions.

8. The lens holder system of claim 7 wherein the motor attaches to a metal driver holder, at least one sliding rod is attached to the metal driver holder at both ends of each sliding rod.

9. The lens holder system of claim 8 wherein the metal driver holder is placed within a light fixture.

10. The lens holder system of claim 7 wherein the motor and sliding rods attach directly within a light fixture.

11. A lens holder comprising:

a bottom cover;

a top cover;

a connector for attaching the top cover to the bottom cover;

a plurality of slot extensions lining the inside surface of the bottom cover wherein a plurality of slot spaces are defined by the surface space between each of the plurality of slot extensions;

and at least one lens is positioned within at least one slot space, said lens with lens type and direction designation marking on the edge of said lens.

12. A lens holder comprising:

a bottom cover;

a top cover;

a connector for attaching the top cover to the bottom cover;

a plurality of slot extensions lining the inside surface of the bottom wherein a plurality of slot spaces are defined by the surface space between each of the plurality of slot extensions; and a lens assembly holder holding at least one lens positioned to straddle at least one slot extension.

13. The lens holder of claim 12 wherein the lens assembly holder comprises a holder ring with an entry port and an exit port, a plurality of lenses placed within the holder ring through the exit port, a plurality of spacers between each of the plurality of lenses, a twist ring which twists onto the exit port of the holder ring, and a plurality of arrows about the exterior.

14. The lens holder of claim 12 wherein the lens assembly holder comprises two halves of a tube with a plurality of interior specific slots for holding lenses of specific width and a plurality of exterior extensions for positioning the lens assembly holder between slot extensions.

* * * * *